(12) United States Patent
Kobori et al.

(10) Patent No.: US 8,219,535 B1
(45) Date of Patent: Jul. 10, 2012

(54) RETAIL DEPLOYMENT MODEL

(75) Inventors: Larry Shigeo Kobori, Newark, CA (US); Carl Katsumi Mayeda, Cupertino, CA (US); Priya Sahai, Cupertino, CA (US)

(73) Assignee: Allstate Insurance Company, Northbrook, IL (US)

( * ) Notice: Subject to any disclaimer, the term of this patent is extended or adjusted under 35 U.S.C. 154(b) by 339 days.

(21) Appl. No.: 12/141,746

(22) Filed: Jun. 18, 2008

Related U.S. Application Data

(63) Continuation-in-part of application No. 11/461,512, filed on Aug. 1, 2006.

(60) Provisional application No. 60/743,295, filed on Feb. 15, 2006, provisional application No. 60/952,989, filed on Jul. 31, 2007.

(51) Int. Cl.
*G06F 7/00* (2006.01)

(52) U.S. Cl. .......................... 707/694; 707/700; 707/701

(58) Field of Classification Search ........... 707/999.101, 707/999.102, 999.006
See application file for complete search history.

(56) References Cited

U.S. PATENT DOCUMENTS

| | | |
|---|---|---|
| 6,681,985 B1 | 1/2004 | Curtin |
| 7,130,865 B2 | 10/2006 | Moore |
| 7,412,398 B1 | 8/2008 | Bailey |
| 7,447,685 B2 | 11/2008 | Nye |
| 2002/0062346 A1 | 5/2002 | Chen |
| 2002/0069090 A1* | 6/2002 | De Grosz et al. ................. 705/4 |
| 2002/0076085 A1 | 6/2002 | Shimazu |
| 2002/0147613 A1 | 10/2002 | Kennard |
| 2002/0161609 A1 | 10/2002 | Zizzamia et al. |
| 2002/0188480 A1 | 12/2002 | Liebeskind et al. |
| 2002/0198755 A1 | 12/2002 | Birkner |
| 2003/0088562 A1 | 5/2003 | Dillon |
| 2003/0125990 A1 | 7/2003 | Rudy et al. |
| 2003/0187740 A1 | 10/2003 | Tanahashi et al. |
| 2004/0044549 A1 | 3/2004 | Loop |
| 2004/0117358 A1 | 6/2004 | von Kaenel |
| 2004/0138953 A1 | 7/2004 | Van Luchene |
| 2004/0153346 A1 | 8/2004 | Grundel |
| 2004/0162752 A1 | 8/2004 | Dean |
| 2004/0186755 A1* | 9/2004 | Roche ............................... 705/4 |
| 2004/0193611 A1* | 9/2004 | Raghunandhan ............... 707/10 |
| 2004/0230467 A9 | 11/2004 | Gailey et al. |
| 2004/0267743 A1* | 12/2004 | Dasari et al. ...................... 707/6 |
| 2005/0043971 A1* | 2/2005 | Hendrickson et al. ............ 705/4 |
| 2005/0071247 A1 | 3/2005 | Kelley |
| 2005/0076013 A1 | 4/2005 | Hilbert |
| 2005/0096971 A1 | 5/2005 | Baechtiger |

(Continued)

OTHER PUBLICATIONS http://www.batchgeocode.com/, pp. 1-4, Apr. 7, 2008, Map Multiple Locations/Find Address Coordinates, © 2007 Phillip Homstrand.

(Continued)

*Primary Examiner* — Pierre Vital
*Assistant Examiner* — Mohammad S Rostami
(74) *Attorney, Agent, or Firm* — Banner & Witcoff, Ltd.

(57) ABSTRACT

A method of determining and optimizing the location of a new insurance agency is disclosed to increase market penetration of underrepresented markets. The method comprises the use of a scoring algorithm to rank various geographic regions or related zip codes. The scoring algorithm may be implemented by a location modeling system based on variables selected by a user. In addition, the various ranked geographic regions or related zip codes may be analyzed for proximity to natural or man made perils.

14 Claims, 19 Drawing Sheets

U.S. PATENT DOCUMENTS

| | | | |
|---|---|---|---|
| 2005/0096972 A1* | 5/2005 | Baechtiger | 705/11 |
| 2005/0240512 A1 | 10/2005 | Quintero | |
| 2005/0262062 A1 | 11/2005 | Xia | |
| 2005/0278313 A1 | 12/2005 | Plow | |
| 2005/0283503 A1 | 12/2005 | Hancock | |
| 2006/0036524 A1 | 2/2006 | Capanna | |
| 2006/0064330 A1 | 3/2006 | Sumino | |
| 2006/0085392 A1 | 4/2006 | Wang | |
| 2006/0100912 A1 | 5/2006 | Kumar | |
| 2006/0116905 A1 | 6/2006 | Yered | |
| 2006/0136273 A1 | 6/2006 | Zizzamia | |
| 2006/0155627 A1* | 7/2006 | Horowitz | 705/35 |
| 2006/0174302 A1 | 8/2006 | Mattern | |
| 2006/0195365 A1 | 8/2006 | Karabetsos | |
| 2006/0206362 A1* | 9/2006 | Rudy et al. | 705/4 |
| 2006/0206438 A1 | 9/2006 | Sakaue | |
| 2006/0242024 A1 | 10/2006 | Mattingly | |
| 2006/0253316 A1 | 11/2006 | Blackshaw | |
| 2006/0253345 A1 | 11/2006 | Heber | |
| 2006/0271531 A1 | 11/2006 | O'Clair | |
| 2006/0282286 A1 | 12/2006 | Faris, III et al. | |
| 2007/0027727 A1 | 2/2007 | Cochrane | |
| 2007/0073610 A1* | 3/2007 | Marugabandhu et al. | 705/37 |
| 2007/0100724 A1* | 5/2007 | Hollas et al. | 705/36 R |
| 2007/0112622 A1 | 5/2007 | Meggs | |
| 2007/0112791 A1 | 5/2007 | Harvey | |
| 2007/0130026 A1 | 6/2007 | O'Pray | |
| 2007/0203759 A1* | 8/2007 | Mathai et al. | 705/4 |
| 2007/0295560 A1 | 12/2007 | Heckel | |
| 2008/0086356 A1* | 4/2008 | Glassman et al. | 705/10 |

OTHER PUBLICATIONS http://map-suite-geocode-usa.thinkgeo-llc.qarchive.org/, pp. 1-2, Apr. 7, 2008, Map Suite Geocode USA 1.0.

http://www.fema.gov/plan/prevent/fhm/dl_mhip.shtm, pp. 1-5, Apr. 7, 2008, Multi-Year Flood Hazard Identification Plan (MHIP).

http://developer.yahoo.com/maps/rest/V1/geocode.html, pp. 1-3, Apr. 7, 2008, Yahoo! Developer Network, © 2008 Yahoo! Inc.

http://www.navteq.com/about/database_about.html, p. 1, Apr. 7, 2008, Our Flagship Offering, © 2008 NAVTEQ.

httpp://www.geocode.com, pp. 1-2, Apr. 7, 2008, Tele Atlas Geocoding Services, © 2008 Tele Atlas.

http://www.geocode.com/index.cfm?module=abouttez, pp. 1-2, Apr. 7, 2008, Tele Atlas Geocoding Services, © 2008 Tele Atlas.

http://web.archive.org/web/20051018080503/www.point-x.com/solutions.htm, Solutions Overview, p. 1, Apr. 7, 2008, © 2005 Point-X Corporation.

http:/www.point-x.com/Overview.htm, Technology, p. 1, Apr. 7, 2008, © 2001 Point-X, 6 Loch Lomond Drive, San Rafael.

http://www.point-x.com/, Point-X Location Intelligence, p. 1, Jun. 18, 2008, © 2001, Point-X, 6 Loch Lomond Drive, San Rafael.

http://www.point-x.com/AboutPointX.htm, About Point-X, p. 1, Apr. 7, 2008, © 2001, Point-X, 6 Loch Lomond Drive, San Rafael.

http:/web.archive.org/web/20051018081137/www.point-x.com/clients.htm, Clients, pp. 1-2, Apr. 7, 2008, © 2005, Point-X Corporation.

http://web.archive.org/web/20051219103214/www.point-x.com/managementteam.htm, Management Team, pp. 1-2, Apr. 7, 2008, © 2005, Point-X Corporation.

http://web.archive.org/web/20051018080524/www.point-x.com/aboutpointx.htm, About Point-X, p. 1, Apr. 7, 2008, © 2005, Point-X Corporation.

Parry, Chris, "Reducing Locations, Maximizing Profit", pp. 1-2.

Sherman, A.J., Franchising & Licensing: Two Powerful Ways to Grow Your Business in Any Economy, 3rd Edition, AMACOM, 2004.

Office Action from U.S. Appl. No. 11/461,512, mailed Mar. 14, 2011.

Final Office Action in related U.S. Appl. No. 11/461,512, dated Feb. 6, 2012.

Office Action from Canadian Office Action No. 2,561,195 mailed Oct. 31, 2011.

Office Action from Canadian Application No. 2,561,198 mailed Jan. 16, 2012.

Office Action from U.S. Appl. No. 11/461,512 mailed Sep. 6, 2011.

* cited by examiner

|  |  | # CUSTOMER | AVE. ITV | % < 1YR | % COLLEGE | # 5YR GROWTH | % 5YR GROWTH |
|---|---|---|---|---|---|---|---|
| 602 | \multicolumn{7}{c}{TABLE 1 VARIBLE INFORMATION (COUNTS, PERCENTAGES, DOLLARS)} |
|  | ZIP | VARIABLE 1 | VARIABLE 2 | VARIABLE 3 | VARIABLE 4 | VARIABLE 5 | VARIABLE 6 |
|  | ZIP001 | 1,408 | $476 | 17.36% | 57.98% | 1,132 | 9.43% |
| 604 | ZIP002 | 1,776 | $428 | 18.36% | 58.63% | 1,720 | 9.96% |
|  | ZIP003 | 749 | $437 | 12.63% | 47.30% | 258 | 3.89% |
|  | ZIP007 | 471 | $838 | 9.53% | 80.40% | 344 | 6.16% |
|  | ZIP009 | 1,007 | $719 | 15.97% | 52.56% | 1,313 | 17.49% |
|  | ZIP011 | 1,308 | $643 | 14.81% | 73.20% | 691 | 3.60% |
|  | ZIP013 | 1,055 | $423 | 15.15% | 51.48% | 595 | 4.72% |
|  | ZIP016 | 0 | $0 | 27.45% | 45.45% | 2 | 3.92% |
| 606 | ZIP050 | 2,274 | $429 | 12.87% | 41.03% | 1,470 | 6.62% |
|  | μ | 490 | $537 | 13.56% | 48.36% | 449 | 8.58% |
|  | σ | 510 | $176 | 3.93% | 15.90% | 437 | 3.79% |

— 609 (arrow pointing to ZIP003 row, VARIABLE 6)

| 602 | \multicolumn{7}{c}{TABLE 2 SCORE PER VARIBLE (RELATIVE TO STATE VARIATION)} |
|---|---|---|---|---|---|---|---|
|  | ZIP | VARIABLE 1 | VARIABLE 2 | VARIABLE 3 | VARIABLE 4 | VARIABLE 5 | VARIABLE 6 |
|  | ZIP001 | 1.801058 | -0.345223 | 0.967658 | 0.605304 | 1.562065 | 0.223749 |
|  | ZIP002 | 2.523188 | -0.618997 | 1.221729 | 0.645836 | 2.906273 | 0.365377 |
| 604 | ZIP003 | 0.507894 | -0.570228 | -0.236824 | -0.066459 | -0.435957 | -1.239403 |
|  | ZIP007 | -0.037628 | 1.708173 | -1.024020 | 2.015633 | -0.239355 | -0.638320 |
|  | ZIP009 | 1.014171 | 1.035440 | 0.612873 | 0.264248 | 1.975843 | 2.352516 |
|  | ZIP011 | 1.604827 | 0.600572 | 0.317407 | 1.562269 | 0.553910 | -1.315017 |
|  | ZIP013 | 1.108362 | -0.646068 | 0.405634 | 0.196049 | 0.334448 | -1.020036 |
|  | ZIP016 | -0.961877 | -3.051984 | 3.532384 | -0.182725 | -1.021190 | -1.230506 |
| 606 | ZIP050 | 3.500420 | -0.614778 | -0.175686 | -0.460829 | 2.334756 | -0.518736 |

— 617

TABLE 3 RANGE OF WEIGHTS ASSIGNED PER VARIABLE — 621

| 1 | 2 | 3 | 4 | 5 | 6 |
|---|---|---|---|---|---|
| .10-.2 | .10-.20 | .10-.20 | .10-.25 | .10-.30 | .15-.20 |

FIG. 6A

TABLE 4 WEIGHTED SCORES (EQUAL WEIGHTS)

| ZIP | VARIABLE 1 | VARIABLE 2 | VARIABLE 3 | VARIABLE 4 | VARIABLE 5 | VARIABLE 6 | COMPOSITE SCORE |
|---|---|---|---|---|---|---|---|
| ZIP001 | 0.300182 | -0.057538 | 0.161280 | 0.100886 | 0.260349 | 0.037292 | 0.802451 |
| ZIP002 | 0.420540 | -0.103168 | 0.203626 | 0.107641 | 0.484388 | 0.060897 | 1.173924 |
| ZIP003 | 0.084651 | -0.095040 | -0.039472 | -0.011077 | -0.072661 | -0.206571 | -0.340170 |
| ZIP007 | 0.006271 | 0.284701 | -0.170673 | 0.335946 | -0.039893 | -0.106389 | 0.0297420 |
| ZIP009 | 0.169032 | 0.172577 | 0.102148 | 0.044042 | 0.329314 | 0.392094 | 1.209206 |
| ZIP011 | 0.267476 | 0.100097 | 0.052902 | 0.260383 | 0.092320 | -0.219174 | 0.554006 |
| ZIP013 | 0.184731 | -0.107680 | 0.067607 | 0.032676 | 0.055742 | -0.170009 | 0.063066 |
| ZIP016 | 0.160316 | -0.508674 | 0.588742 | -0.030455 | -0.170202 | -0.205089 | -0.485993 |
| ZIP050 | 0.583415 | -0.102465 | -0.029282 | -0.076806 | 0.389134 | -0.086458 | 0.677538 |

TABLE 5 WEIGHTED SCORES (VARYING WEIGHTS)

| ZIP | VARIABLE 1 | VARIABLE 2 | VARIABLE 3 | VARIABLE 4 | VARIABLE 5 | VARIABLE 6 | COMPOSITE SCORE |
|---|---|---|---|---|---|---|---|
| ZIP001 | 0.225132 | -0.043153 | 0.096766 | 0.121061 | 0.468620 | 0.033562 | 0.90198781 |
| ZIP002 | 0.315399 | -0.077375 | 0.122173 | 0.129167 | 0.871882 | 0.054807 | 1.41605224 |
| ZIP003 | 0.063487 | -0.071278 | -0.023682 | -0.013292 | -0.130787 | -0.185910 | -0.3614634 |
| ZIP007 | -0.004704 | 0.213522 | -0.102402 | 0.403127 | -0.071807 | -0.095748 | 0.34199808 |
| ZIP009 | 0.126771 | 0.129430 | 0.061287 | 0.052850 | 0.592753 | 0.352877 | 1.31596875 |
| ZIP011 | 0.200603 | 0.075072 | 0.031741 | 0.312454 | 0.166173 | -0.197253 | 0.58878976 |
| ZIP013 | 0.138545 | -0.080759 | 0.040563 | 0.039210 | 0.100334 | -0.153005 | 0.08488892 |
| ZIP016 | -0.120235 | -0.381498 | 0.353238 | -0.036545 | -0.306357 | -0.184576 | -0.6759721 |
| ZIP050 | 0.437552 | -0.076847 | -0.017569 | -0.092166 | 0.700427 | -0.077810 | 0.87358715 |

*FIG. 6B*

| TABLE 1 COMPOSITE & FINAL SCORE (EQUAL WEIGHTS) | | | | | |
|---|---|---|---|---|---|
| ZIP | COMPOSITE SCORE | μ | σ | FINAL SCORE | ZIPRANK |
| ZIP001 | 0.802451 | 6.42761E-17 | 0.464196 | 1.728691 | 5 |
| ZIP002 | 1.173924368 | 6.42761E-17 | 0.464196 | 2.528941 | 2 |
| ZIP003 | -0.34016957 | 6.42761E-17 | 0.464196 | -0.732815 | 44 |
| ZIP007 | 0.297419667 | 6.42761E-17 | 0.464196 | 0.64072 | 13 |
| ZIP009 | 1.209206133 | 6.42761E-17 | 0.464196 | 2.604948 | 1 |
| ZIP011 | 0.554005666 | 6.42761E-17 | 0.464196 | 1.193474 | 9 |
| ZIP013 | 0.063066115 | 6.42761E-17 | 0.464196 | 0.135861 | 19 |
| ZIP016 | -0.48599269 | 6.42761E-17 | 0.464196 | -1.046956 | 51 |
| ... | | | | | |
| ZIP050 | 0.677537972 | 6.42761E-17 | 0.464196 | 1.459595 | 6 |

| TABLE 2 COMPOSITE & FINAL SCORE (VARYING WEIGHTS) | | | | | |
|---|---|---|---|---|---|
| ZIP | COMPOSITE SCORE | μ | σ | FINAL SCORE | ZIPRANK |
| ZIP001 | 0.901987809 | 6.42761E-17 | 0.5421449 | 1.663739 | 5 |
| ZIP002 | 1.416052242 | 6.42761E-17 | 0.5421449 | 2.611944 | 1 |
| ZIP003 | -0.36146344 | 6.42761E-17 | 0.5421449 | -0.666729 | 43 |
| ZIP007 | 0.341988081 | 6.42761E-17 | 0.5421449 | 0.630806 | 13 |
| ZIP009 | 1.315968747 | 6.42761E-17 | 0.5421449 | 2.427338 | 2 |
| ZIP011 | 0.588789762 | 6.42761E-17 | 0.5421449 | 1.086038 | 10 |
| ZIP013 | 0.084888917 | 6.42761E-17 | 0.5421449 | 0.15658 | 20 |
| ZIP016 | -0.67597207 | 6.42761E-17 | 0.5421449 | -1.246848 | 54 |
| ... | | | | | |
| ZIP050 | 0.873587152 | 6.42761E-17 | 0.5421449 | 1.611354 | 6 |

FIG. 7

| ZIP | HOUSEHOLDS (2003) | 5 YEAR HH CHANGE | % IN CURRENT RESIDENCE <1 YEAR | % COLLEGE EDUCATION | AGENCY DEPLOYMENT INDEX | EA | IA | TOTAL COMPETITOR AGENTS | % ALLSTATE HH PENETRATION | ALLSTATE CUSTOMER HOUSEHOLDS | PROSPECTS |
|---|---|---|---|---|---|---|---|---|---|---|---|
| ZIP 1 | 2,001 | 2,045 | 34.78% | 91.45% | 6.93 | 0 | 0 | 0 | 2.75% | 55 | 1,946 |
| ZIP 2 | 5,003 | 2,230 | 17.45% | 55.47% | 5.80 | 0 | 1 | 4 | 8.06% | 403 | 4,600 |
| ZIP 3 | 6,577 | 2,319 | 8.51% | 61.66% | 5.18 | 1 | 0 | 8 | 13.99% | 920 | 5,657 |
| ZIP . | 29,650 | 8,776 | 31.92% | 82.13% | 5.14 | 1 | 0 | 18 | 10.77% | 3,193 | 26,457 |
| ZIP . | 14,082 | 3,556 | 20.30% | 69.80% | 5.02 | 1 | 0 | 30 | 12.04% | 1,696 | 12,386 |
| ZIP . | 25,134 | 2,656 | 24.47% | 76.86% | 5.00 | 1 | 0 | 32 | 9.15% | 2,299 | 22,835 |
| ZIP . | 16,182 | 4,032 | 20.42% | 55.61% | 4.95 | 0 | 0 | 18 | 8.79% | 1,422 | 14,760 |
| ZIP . | 7,598 | 2,438 | 21.05% | 76.22% | 4.83 | 1 | 1 | 10 | 12.46% | 947 | 6,651 |
| ZIP . | 10,139 | 2,653 | 18.96% | 83.66% | 4.71 | 1 | 1 | 29 | 11.19% | 1,135 | 9,004 |
| ZIP . | 20,563 | 3,247 | 17.55% | 59.61% | 4.58 | 1 | 0 | 36 | 12.02% | 2,471 | 18,092 |
| ZIP . | 20,157 | 4,836 | 27.73% | 88.04% | 4.33 | 0 | 0 | 43 | 13.80% | 2,781 | 17,376 |
| ZIP . | 5,488 | 1,843 | 26.59% | 79.00% | 4.32 | 1 | 0 | 6 | 12.04% | 661 | 4,827 |
| ZIP . | 23,972 | 4,558 | 14.15% | 51.62% | 3.98 | 1 | 0 | 58 | 10.21% | 2,448 | 21,524 |
| ZIP . | 22,851 | 7,086 | 31.34% | 57.71% | 3.85 | 1 | 0 | 38 | 9.42% | 2,153 | 20,698 |
| ZIP . | 26,856 | 3,817 | 24.70% | 86.52% | 3.75 | 0 | 0 | 22 | 8.71% | 2,339 | 24,517 |
| ZIP n | 26,564 | 4,869 | 18.84% | 81.59% | 3.65 | 1 | 0 | 30 | 14.62% | 3,007 | 17,557 |

FIG. 8

| ADDRESS DETAILS | |
|---|---|
| STREET: | 123 MAIN ST |
| CITY: | CITY |
| STATE: | CT |
| ZIP CODE: | 06605 |

1602

| DISTANCE FROM SHORELINE IS 2,662 FEET (0.5 MI / 0.81 KM) | GO | CLEAR |
|---|---|---|

RETAIL DEPLOYMENT MODEL

This application is a continuation-in-part of U.S. application Ser. No. 11/461,512, filed Aug. 1, 2006, which claims the benefit of U.S. Provisional Application No. 60/743,295, filed Feb. 15, 2006, the disclosure of which is herein incorporated by reference in its entirety. This application also claims the benefit of U.S. Provisional Application No. 60/952,989, filed Jul. 31, 2007, the disclosure of which is herein incorporated by reference in its entirety.

FIELD OF THE INVENTION

The present invention relates to business location modeling systems and methods. More particularly, the invention relates to insurance agency location modeling to establish new insurance agency locations in various geographic locations based on an evaluation of user selected criteria.

BACKGROUND

The decision to open a new office or branch in order to increase sales for various different types of products or services in a particular geographical region or postal zip code can involve consideration of numerous factors such as population density, potential population growth, customer household data, and traffic flow patterns. When determining a location for a new office or branch for an insurance company, a business entity or business owner may desire to consistently use the same factors or analysis when comparing different geographical locations for the new office site. The use of inconsistent data or factors across geographic locations may result in a suboptimal site location being selected for a new office or branch.

Moreover, as the number of potential geographic regions increases, it can be desirable to standardize results so that comparisons between the different geographic regions may be utilized. For example, a company providing a particular product or service may wish to open a number of new offices or branches across a large geographic region such as the United States. With such a large geographic region to consider, it can be desirable to display comparable results to decision makers so that suitable site locations may be selected.

Current site location models in use in other industries such as retail pharmacy do not take into account unique factors and problems found in the insurance industry. In addition, existing site location models or systems of other industries may not utilize an overall scoring method that allows results to be consistently and easily displayed to the decision maker or business entity. Without an overall scoring methodology, the analysis of the results is more time consuming and inefficient involving the unnecessary consumption of numerous resources.

Furthermore, it is desirable to take into account a host of perils that affect a geographic area during comparison of potential insurance agency site locations. These perils may include natural events such as a volcanic eruption, earthquake, landslide, avalanche, flood, tsunami, hurricane, tornado, and/or wildfire and perils related to human activity such as toxic waste and/or industrial accidents.

Therefore, there is a need in the art for an insurance agency location modeling method and system regarding the process of determining successful placement of future insurance agency locations. The method and system for suitable insurance agency locations must provide consistent and easily interpreted results.

SUMMARY

Aspects of the invention overcome problems and limitations of the prior art by providing a method of determining suitable locations for insurance agency locations. The disclosed method may be utilized to increase market penetration of underrepresented markets. The method comprises the use of a scoring algorithm to rank various geographical regions by related zip codes. The scoring algorithm may be implemented by a location modeling system based upon markets selected by a user. The method further comprises use of distance modeling to determine risk from various perils.

In an exemplary aspect of the invention, a user may select a geographical region to be evaluated for placement of an insurance agency location. The geographical region may be in the form of a postal zip code. Various modeling factors are used to determine a highly suitable location for a new insurance agency. A score for each zip code is calculated with the highest overall score representing the most highly suitable, preferred or optimized location for the new office or branch.

In yet another exemplary aspect of the invention, a user may calculate a distance from, or inclusion within a risk border as a shoreline or an elevation contour for use in evaluation of insurance agency placement and assessment of customer locations. In an embodiment, a peril may include a host of natural events such as a volcanic eruption, earthquake, landslide, avalanche, flood, tsunami, hurricane, tornado, and/or wildfire and perils related to human activity such as toxic waste and/or industrial accidents. The distance calculations may account for the curvature of the earth to ensure an accurate calculated distance from the risk border to the potential insurance agency location. Furthermore, for each geographical region analyzed, the population, households, current customer count, agency deployment score, and the households in each of the distance ranges from the risk border may be displayed in a table and/or shown on an interactive map.

In yet another aspect of the invention, a calculated distance from the risk border may be used as a modeling factor in determining the overall score for each zip code being analyzed for a potential new office or branch location.

In certain embodiments of the invention, the present invention can be partially or wholly implemented with a computer-readable medium, for example, by storing computer-executable instructions or modules, or by utilizing computer-readable data structures. Of course, the methods and systems of the above-referenced embodiments may also include other additional elements, steps, computer-executable instructions, or computer-readable data structures.

The details of these and other embodiments of the present invention are set forth in the accompanying drawings and the description below. Other features and advantages of the invention will be apparent from the description and drawings.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 6a, 6b, and 7 illustrate the calculation of a final score for selected zip codes in accordance with an aspect of the invention.

FIG. 8 illustrates the display of the final score along with additional profile information associated with the particular zip code in accordance with an aspect of the invention.

FIG. 16 illustrates a user display showing details of a calculated shoreline distance from a potential agency or customer location in accordance with an aspect of the invention.

DETAILED DESCRIPTION

Exemplary Operating Environment

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
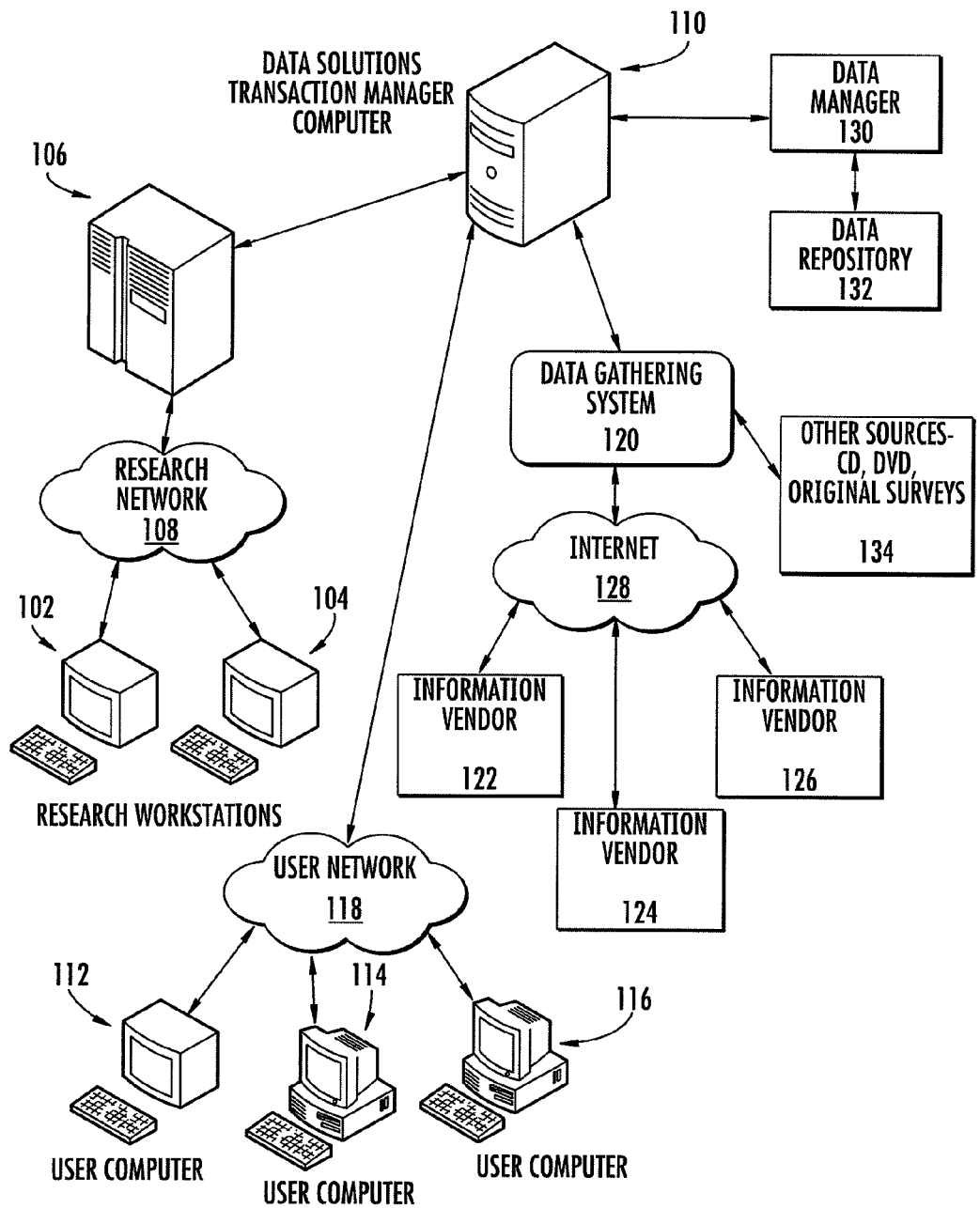
FIG. 1 shows a diagram of a computer system that may be used to implement aspects of the invention.

FIG. 1 shows a diagram of a computer system that may be used to implement aspects of the invention. A plurality of computers, such as research workstations 102 and 104, may be coupled to user computers 112, 114, and 116 via networks 108 and 118. User computer 112 may be coupled to a data solutions transaction manager computer 110, which is described in detail below. User computers 112, 114, and 116 provide decision makers with a user interface for displaying policy information and decisions such as potential new agency locations, and enable users to interact with data solutions transaction manager computer 110.

User computers 112, 114 and 116 and research workstations 102 and 104 may require information from external data sources to assist in evaluation of a potential new agency location. Requests for such information may be transmitted via data solutions transaction manager computer 110 to a data gathering system 120. Data gathering system 120 may include a processor, memory and other conventional computer components and may be programmed with computer-executable instructions to communicate with other computer devices. Data gathering system 120 may access original primary survey data 134 and external sources of information, such as information vendors 122, 124 and 126 via the Internet 128. Information vendors may include federal or state agencies that provide census type information and/or other geographical type data such as maps.

An exemplary information vendor or source that may provide data on population and housing characteristics within the United States is the American Community Survey (ACS). ACS is an official survey of the U.S. Census Bureau. ACS data is organized by a new census geography called a Public Use Micro-data Area (PUMA). Those skilled in the art may recognize the ability to calculate estimates and forecasts of population and housing characteristics of each PUMA, state, and the country. PUMAs represent special non-overlapping areas that partition a state. In general, a PUMA represents an area which may include all or part of several zip codes. In an embodiment, the United States may be divided up and represented by 2,071 PUMAs.

Data solutions transaction manager 110 may be programmed with computer-executable instructions to receive requests for data from user computers 112, 114 and 116 and research workstations 102 and 104, format the requests and transmit the requests to data gathering system 120. In one embodiment of the invention, requests for data are in the form of documents that are in extensible markup language (XML) format. Data solutions transaction manager 110 may also be coupled to a data manager computer device 130 that accesses customer data stored in a data repository 132. In one embodiment of the invention, all data gathered on a customer or potential customer is stored in data repository 132 so that when additional requests are made for the same data, the data may quickly be obtained without requesting it from information vendors 122, 124 and 126. Data repository 132 may be implemented with a group of networked server computers or other storage devices.

Users and decision makers may be provided with a user interface on user computers 112, 114 and 116 for displaying information. This user interface may enable users and decision makers to interact with data solutions transaction manager 110. The user interface may allow a user or decision maker to perform a variety of functions, such as entering local market data into analysis report templates, and displaying decision results. In addition, users and decision makers may execute various analysis tools to answer questions such as: 1) "Where is the best location for a new office?", 2) "What is the makeup of the population?", 3) "Where are our competitors' offices?", 4) "Which markets will experience household and vehicle growth?", and 5) "Are there enough prospects that own homes in a three mile radius around a particular agent's office?"

In an embodiment, senior decision makers may use the system to improve their understanding of the marketplace, facilitating business decisions. The senior decision maker may select various geographic regions and run various reports to obtain agency deployment information.

One or more of the computer devices and terminals shown in FIG. 1 may include a variety of interface units and drives for reading and writing data or files. One skilled in the art will appreciate that networks 108, 118 and 128 are for illustration purposes and may be replaced with fewer or additional computer networks. One or more networks may be in the form of a local area network (LAN) that has one or more of the well-known LAN topologies and may use a variety of different protocols, such as Ethernet. One or more of the networks may be in the form of a wide area network (WAN), such as the Internet. Computer devices and other devices may be connected to one or more of the networks via twisted pair wires, coaxial cable, fiber optics, radio waves or other media.

The term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" but also a "content network," which is comprised of the data—attributable to a single entity—which resides across all physical networks.

Exemplary Embodiments

Figure 2:
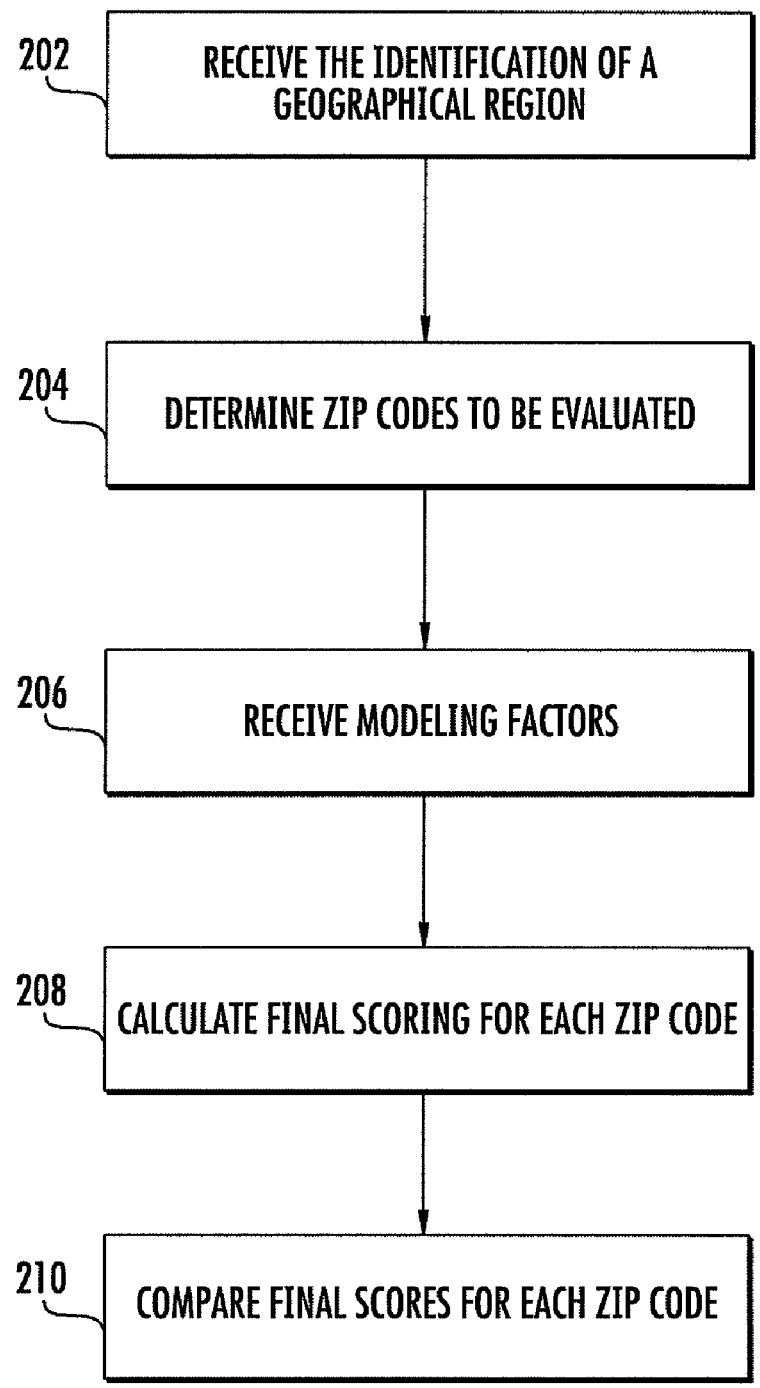
FIG. 2 illustrates a method of application of the insurance agency location modeling system in accordance with an aspect of the invention.

FIG. 2 illustrates a method of determining a suitable location of an insurance agency location in an embodiment of the invention. The method may be implemented by a location modeling system being executed on a computer such as data solutions transaction manager 110. The method of FIG. 2 will be illustrated in the following exemplary embodiment.

Figure 3:
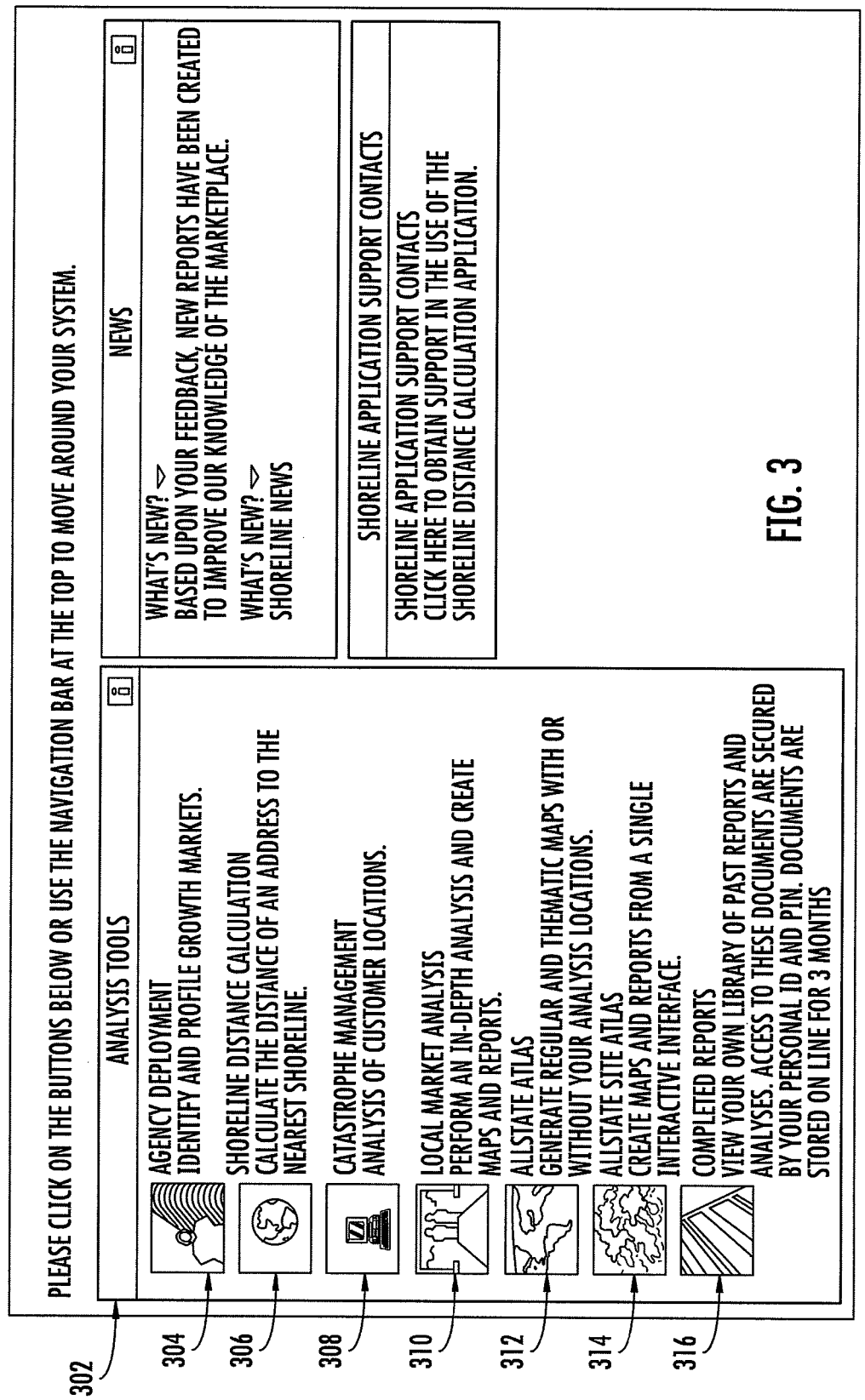
FIG. 3 illustrates an exemplary user interface screen for a section of the agency deployment modeling system in accordance with an aspect of the invention.

FIG. 3 illustrates a user interface screen 302 that may be presented to a user by the data solutions transaction manger 110. The user interface screen 302 may enable a user to execute a number of different analysis tools such as agency deployment tool 304, a report generation tool to calculate address distance to the shoreline 306, a catastrophe risk management tool 308, a local market analysis tool 310, atlas tools 312 and 314, and/or a library of generated reports tool 316. A user may execute the agency deployment tool 304 by clicking on the agency deployment box.

Figure 4:
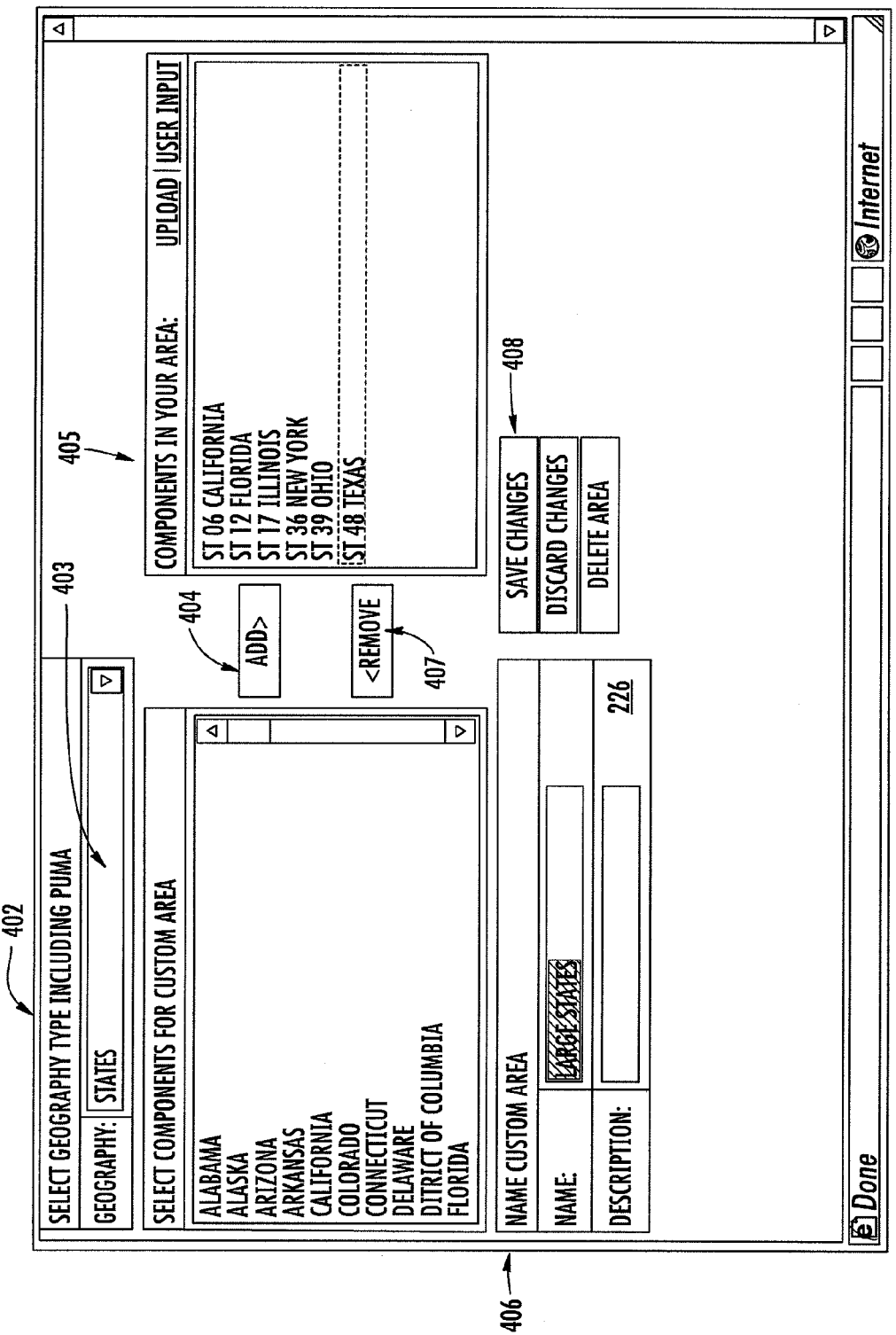
FIG. 4 illustrates an exemplary user interface screen enabling a user to select various geographic regions in accordance with an aspect of the invention.

Upon activation of the agency deployment tool 304, in a first step 202, a user selects at least one geographic region to be evaluated for placement of a new insurance agency location. The geographic region may be a region of the United States such as the Midwest or may be a combination of various different states, cities, towns, neighborhoods, or other geographic identifiable regions. In addition, the user may select a particular PUMA which represents a geographical region extending across multiple zip codes. Those skilled in the art will realize that numerous different geographic regions and combinations may be defined for analysis. For instance, FIG. 4 illustrates a user interface screen 402 that enables the user to select various U.S. States, geographical types, including PUMAs for analysis based on selection box 403.

Figure 5:
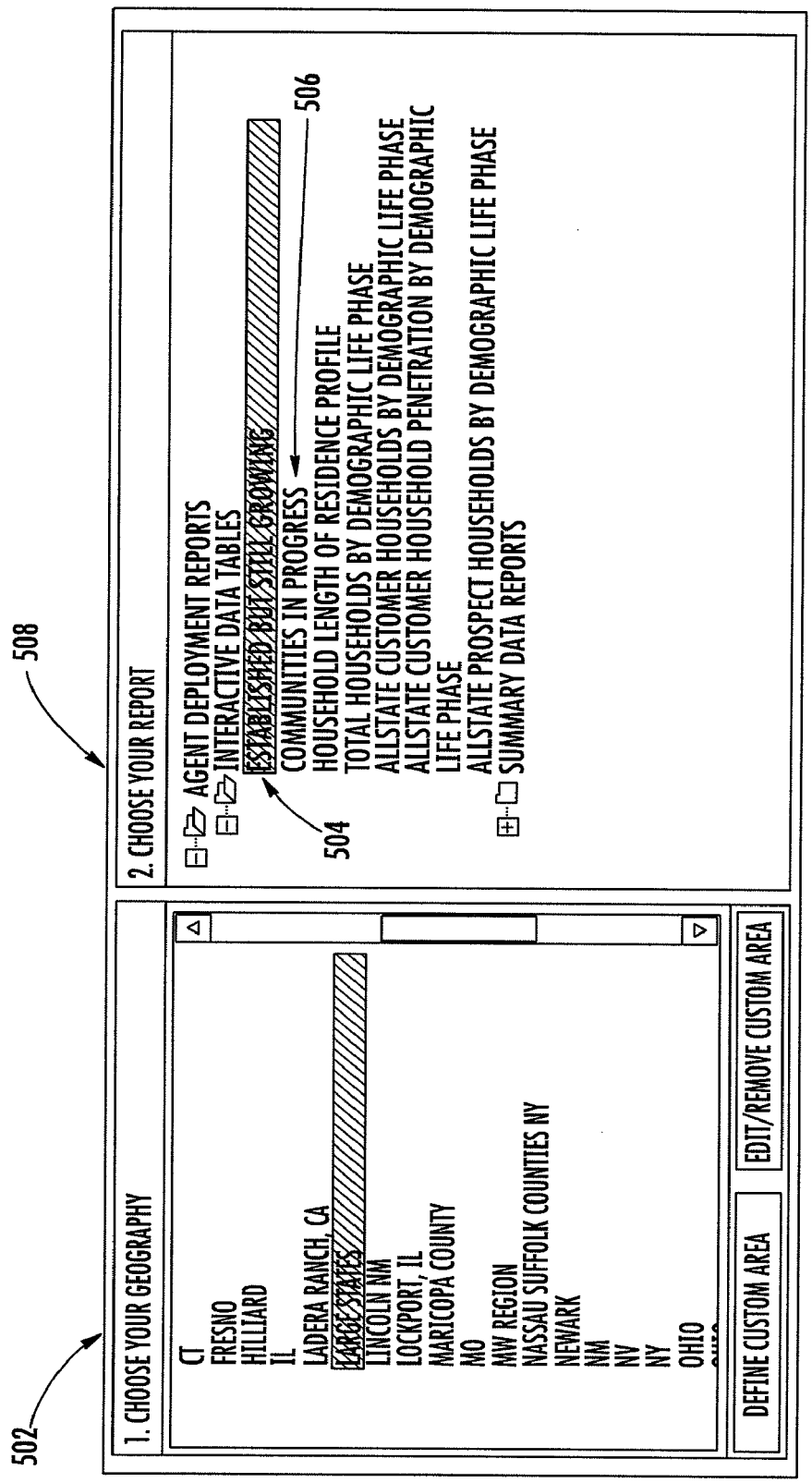
FIG. 5 illustrates the selection of a predefined template in accordance with an aspect of the invention.

A user may create a customized geographic region for ease of use in future sessions. For example, a user may select California, Florida, Illinois, New York, Ohio, and Texas using the add button 404 and define these selected States 405 as the "Large States" 406. Similarly, a user may edit their customized selection through the use of the remove button 407. A user may save their customized selection using the "Save Changes" button 408. Once saved, a user may select their customized selection during future modeling sessions as illustrated in FIG. 5 in the "Choose Your Geography" selection screen 502.

Based on the user selected geographic regions, the underlying or related zip codes for selected geographic regions are determined in step 204. The use of zip codes enables all of the collected data from various data sources to be converted into data that may be used and scored on a common metric scale. The common metric scale allows various information sources to be integrated and scored. Those skilled in the art will realize that distinguishable data other than zip codes may be used in order to allow processing of data on a common metric scale.

Next, in step 206, data is received from the user which includes at least one modeling factor to be utilized in the determination of the insurance agency location. Those skilled in the art will realize that any number or combination of modeling factors may be used depending upon the marketing or agency growth strategy.

The modeling factors may include one of the following exemplary factors: 1) households with 2+ vehicles current year estimate; 2) households with 2+ vehicles five year projection; 3) net change vehicle households in five years; 4) owner occupied dwellings current year estimate; 5) owner occupied dwellings five year projection; 6) net change in owner occupied dwellings in five years; 7) total households current year estimate; 8) total household five year projection; 9) net change (number and %) in households in five years; 10) new movers; 11) new homeowners; 12) average household net worth; 13) average household income; 14) population 25+ years old; 15) population 25+ with some college education; 16) population 25+ with associate degree; 17) population 25+ with bachelor's degree; 18) population 25+ with graduate or professional degree; 19) percent population 25+ any college education; 20) households with length of residence less than one year; 21) percent households with length of residence less than one year; 22) total real estate transactions; 23) active property insurance casualty policies; 24) active life/financial insurance policies; 25) active insurance policies; 26) total insurance customer households; 27) total insurance customer household lifetime value; 28) average insurance customer household lifetime value; 29) value of expansion opportunity; 30) new businesses; 31) United States Postal Service (USPS) Delivery Units Statistics for delivered mail; and 32) United States Postal Service (USPS) Delivery Units Statistics for undelivered mail.

As those skilled in the art will realize, the above modeling factors and/or combinations of modeling factors do not represent an exhaustive list of modeling factors that may used in the determination of agency locations. As an alternative, to the individual selection of each of the modeling factors, templates may be defined with particular modeling factors to be used in the agency location model. For example, templates such as "Established but Still Growing" template 504 in FIG. 5, and a "Communities in Progress" template 506 may be selected from a group of preexisting templates. Each template may contain modeling factors that have been proven to be statistically important when trying to identify particular growth opportunities such as finding markets that have existing neighborhoods that are still growing. The following factors may be preselected to be used with the "Established but Still Growing" template 504: 1) net change (number and %) in households in five years; 2) percent population 25+ years old with any college education; 3) percent households with length of residence less than one year; 4) total insurance customer households; 5) average insurance customer household lifetime value; and/or 6) change in the number of postal delivery units. Average insurance customer household lifetime value may be calculated by subtracting projected expenses for a customer from projected revenue for each calendar year over a time span of a projected retention period. These values may then be averaged to compute the average insurance customer lifetime value. These are calculated and accessible for use in the model via research network 108.

In another example, the "Communities in Progress" template 506 may identify growth opportunities in generally smaller communities experiencing recent change. This template 506 may only evaluate and score lower density rural/small town communities in the model. Modeling factors that may be utilized when the "Communities in Progress" template 506 is used may include: 1) new movers; 2) new homeowners; 3) percent households with length of residence less than one year; 4) new businesses; and 5) USPS quarterly delivery units statistics.

In step 208, a final score per zip code may be calculated. The calculation of the scores may be determined by the following equations:

$$\frac{\text{Varibable 1 information} - \text{Variable 1}\mu}{\text{Variable 1}\sigma} = \text{Variable 1 score} \quad \text{Equation 1}$$

$$\begin{aligned}(\text{Variable 1 score} * \text{Variable 1 weight}) + (\text{Variable 2}\\ \text{score} * \text{Variable 2 weight}) + (\text{Variable 3}\\ \text{score} * \text{Variable 3 weight}) + \text{other}\\ \text{Variables} = \text{Composite score}\end{aligned} \quad \text{Equation 2}$$

$$\frac{\text{Composite Score} - \mu}{\sigma} = \text{Final Score} \quad \text{Equation 3}$$

In equations 1 and 3, $\mu$ represents the mean and $\sigma$ represents standard deviation of the individual variables and variable scores multiplied by their variable weights. A positive score reflects greater potential for future business growth in the particular geographic region of interest. A negative score reflects less opportunity for future growth relative to the variation within each geographic region. For example, FIGS. 6a, 6b, and 7 illustrate the calculation of a final score for zip codes in a state, "zips 001 to 003" 602, "zips007, 009, 011, 013, and 016" 604, and "zip050" 606. Each of the zip codes represents a geographic region selected by the user for evaluation. In FIG. 6a, six variables are modeled to identify growth opportunities for placement of insurance agency locations. Variable information 609 for each of the zip codes listed 602, 604, and 606 is shown in Table 1 of FIG. 6a. The variable information includes counts, dollars, and percentage information for the six modeling factors.

A score per variable 617 using equation 1 is calculated for each of the zip codes listed 602, 604, and 606 as shown in Table 2 of FIG. 6a. Table 3 illustrates that a range of weighting factors 621 may be applied to each of the variables. Those skilled in the art will realize that different ranges of weighting factors may be used for each of the modeling factors and that the weighting factors may change over time and with use of model. The weighting factors may be adjusted so that a particular modeling factor is given more significance in the calculation of the final score. In the examples of FIG. 6b, each variable can be assigned equal or varying weights. Table 4, using equation 2, illustrates zip codes 602, 604, and 606 with equal weights. The calculated composite score for "zip 001" 602 is 0.802451 (616), "zip007" 604 is 0.297420 (618), and "zip050" 606 is 0.677538 (620). Table 5 illustrates these same zip codes 602, 604, and 606 with varying weights. Table 5 lists the calculated composite score for "zip 001" 602 is 0.90198781 (680), "zip 007" 604 is 0.34198808 (682), and "zip 050" 606 is 0.87358715 (684).

Next, equation 3 is applied to each of zip codes 602, 604, and 606 as illustrated in Tables 1 and 2 of FIG. 7. For example Table 1 of FIG. 7, calculates the Final Score using equal weights for "zip001" 602 is 1.728691 (720), "zip007" 604 is 0.64072 (722), and "zip050" 606 is 1.459595 (724). Table 2 illustrates the calculated Final Score using varying weights for zips 602, 604, 606. FIG. 7 zip code examples are based upon actual information for the state of Delaware. The positive scores reflect greater potential for future business growth in the particular geographic region of interest; whereas, the negative scores reflect less opportunity for future growth relative to the variation within each geographic region. Finally, the zip codes are ranked and compared in step 210 according to their value 702, 706, and 704 (uses equal weights); 750, 770, and 760 (uses varying weights).

The final scores for each zip code may be displayed along with additional profile information which may be of interest to the user. For example, the final scores may be integrated with profile information to create new perspectives and insights regarding each market. An example of such profile information is illustrated in FIG. 8. In FIG. 8, a zip code 802 along with its associated Final Score, also may be designated as Agency Deployment Index, of 6.93 (804) is shown with profile information such as number of households in 2003 (806) and percentage of college education (808). Other profile information that may be displayed includes recent change information, projected growth number, percent current insurance penetration, number of prospects, current number and type of insurance agencies, and number of competitor insurance agencies. Profile information is periodically updated (annually, bi-annually, quarterly, or biweekly).

Figure 9:
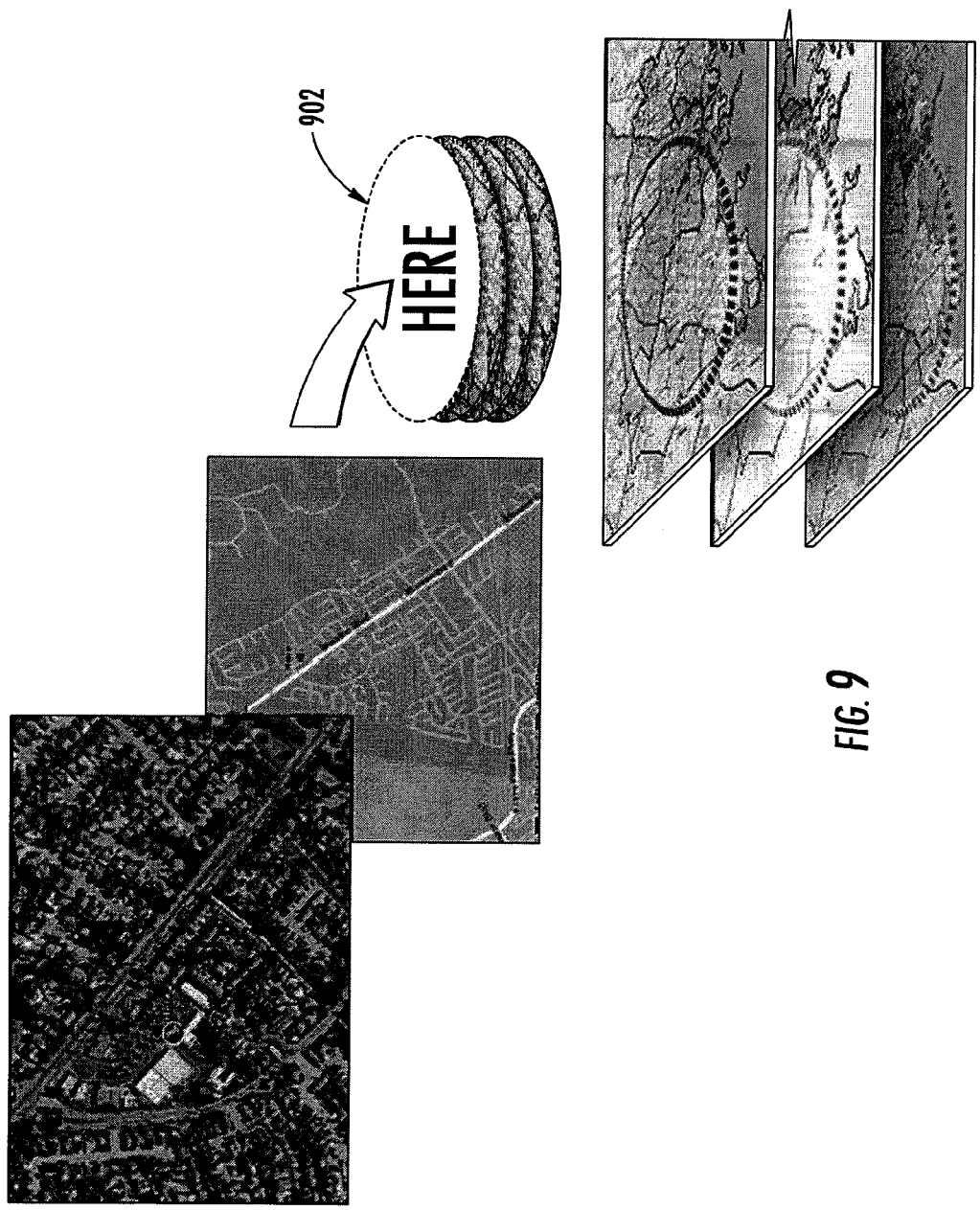
FIG. 9 illustrates a map in which a particular zip code may be viewed by a user in accordance with an aspect of the invention.

Any of the selected zip codes may be displayed on a map such that specific point locations and surrounding areas may be interactively defined with respective model outputs and information generated for surrounding areas. For example, FIG. 9 illustrates a map in which a particular zip code is illustrated by the region defined at 902. In addition, user defined map features may display information such as model outputs, competitor agency locations, and other useful information. The maps may also contain three-dimensional aerial imagery and other geographic features (cartography) which may be displayed to the user. The integration of the results of the final scores along with additional information such as competitor agency locations and cartography may enable a user to pinpoint a highly suitable potential location for the new agency in a particular neighborhood at a particular street address. In addition, reports may be generated detailing the scores for each of the selected zip codes or geographic regions along with detailed maps of each of these potential new agency locations.

A few examples of a few embodiments of the invention are provided below. These examples describe only versions of a few embodiments of the invention. The invention is not limited to the examples described below and includes numerous additional embodiments and versions. The examples should not be read to limit the disclosure of the invention in this application.

Example 1

An insurance agency location is determined through steps of (1) receiving from a user at least one geographic region to be evaluated for placement of the insurance agency location, (2) based on at least one geographic region received in step (1), determining related zip codes to be evaluated, (3) receiving from the user at least one modeling factor to be utilized in the determination of the insurance agency location, (4) calculating at a processor a final score for each of the zip codes determined in step (2); and (5) comparing the final scores for each of the zip codes to determine the zip code with the highest final score The receiving, determining, calculating and comparing can be performed by a computer. They also can be performed by a person. In addition, the modeling factors that may be used include one or more of the following: total and net change in households in current year and last five years; number of new homeowners and new movers; percentage of population with at least twenty five years of age and some college education; percentage of households with length of residency of less than one year; total number of agency customer households; total number of new businesses; agency customer household lifetime value; whether or not household maintains 2 or more vehicles; whether a dwelling is owner occupied; average household income; average household net worth; and/or change in the number of postal delivery units.

Example 2

The location for an insurance agency is determined using at least the following steps. A geographic region to be evaluated for placement of the insurance agency location is received from a user. Based on this geographic region, particular zip codes are identified to be evaluated. A composite score is calculated for each zip code. A final score is then calculated at a processor for each of the zip codes using the formula $$\frac{\text{Composite Score} - \mu}{\sigma} = \text{Final Score}$$

The final scores are compared to each other to determine the relative ranking. The final scores may be displayed on a map and/or summarized and detailed in a report.

Example 3

A computer-readable medium contains computer-executable instructions for causing a computer device to perform a number of steps. These steps include (a) receiving from a user zip codes to be evaluated for placement of an insurance agency location; (b) receiving from research terminal 102, 104 modeling factors to be utilized in the determination of the insurance agency location; (c) calculating at a processor a final score for each of the zip codes received in step (a); (d) comparing the final scores for each of the zip codes to determine the zip code with the highest final score; and (e) displaying the final scores for each of the zip codes on a map and/or report that contains at least street level information.

In another aspect of the invention, final scores for each zip code may be displayed along with additional information which may be useful to the user such as a calculated distance to a coastline or shoreline for use assessing additional risk factors. Those skilled in the art will realize that if a particular site location is within a defined distance range of a risk border such as a coastline or shoreline, then the site location may be treated as subject to increased underwriting scrutiny and consideration. For instance, a potential insurance agency location located near a coastline or shoreline may acquire customers that represent additional risks from hurricanes and other perils due to the close proximity to the coastline or shoreline.

Those skilled in the art will realize that in various aspects of the invention, a coastline and/or shoreline refers to a line of contact between land and a body of water. Furthermore, those skilled in the art will realize that a body of water may include but is not limited to oceans, lakes, rivers, streams, canals, and/or reservoirs.

Furthermore, those skilled in the art will also realize that coastline and shoreline are only two such risk borders, which may be evaluated using distance calculations, and that other types of risk borders and associated perils include but are not limited to a host of natural events such as a volcanic eruption, earthquake, landslide, avalanche, flood, tsunami, hurricane, tornado, and/or wildfire and perils related to human activity such as toxic waste and/or industrial accidents. These perils and associated risk borders may also be considered in agency placement and displayed on an interactive map for further analysis.

Figure 10:
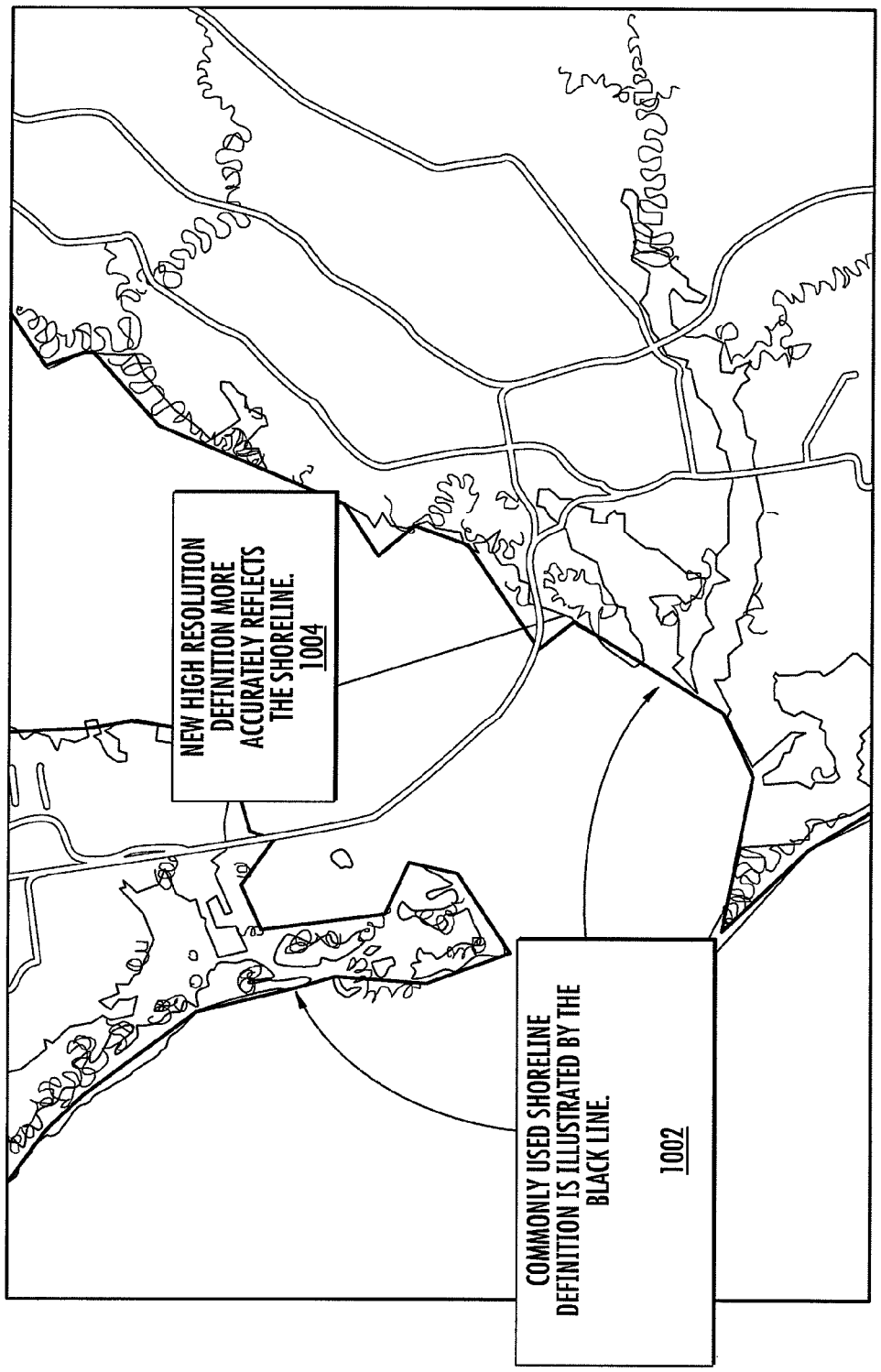
FIG. 10 illustrates a high resolution shoreline definition in accordance with an aspect of the invention.

FIG. 10 illustrates shoreline definitions in accordance with an aspect of the invention. As shown in FIG. 10, a commonly used shoreline definition is shown at 1002. However, the commonly used shoreline definition 1002 may under and/or over-estimate distances from a shoreline to geographical locations as the shoreline definition is a gross approximation of the estimated shoreline location. The commonly used shoreline definitions may be based upon state boundaries.

In an aspect of the invention, updated and improved National Oceanic & Atmospheric Administration (NOAA) defined boundaries may be overlaid directly onto cartography maps. These overlays may allow for a clear picture of boundaries and the associated cartography. For instance, FIG. 10 at 1004 shows the NOAA boundaries overlaid onto cartography maps to form a new high resolution definition of the displayed shoreline.

Figure 11:
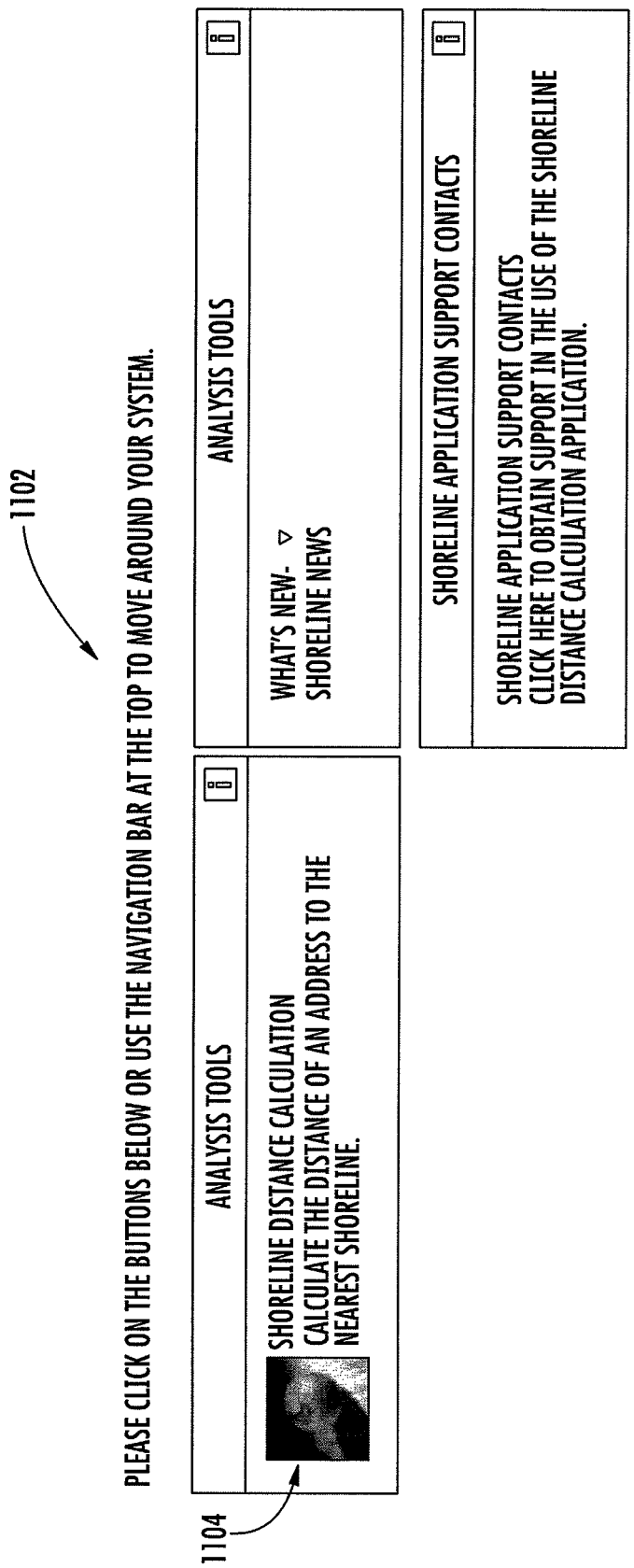
FIG. 11 illustrates an exemplary user interface screen for a shoreline distance calculation in accordance with an aspect of the invention.

FIG. 11 illustrates an exemplary user interface screen 1102 for calculating a distance to shoreline 1104 in accordance with an aspect of the invention. In FIG. 11, a user may in an embodiment enter a particular street address and calculate the distance to the nearest shoreline. In other embodiments, the number and location of assets subject to one or more perils may be determined within a selected distance range or distance band from the asset to a risk border.

In an aspect of the invention, calculating the distance to a shoreline involves manipulating data supplied from a NOAA shoreline data file. Each of the lines supplied in the NOAA shoreline data file may be broken up into individual line segments. Furthermore, each of the line segments may be defined by nodes. The generated nodes may include millions of nodes depending upon the extent of the original shoreline data files. In an embodiment to ensure accurate distance processing, a line segment coming into a node and a line segment leading away from the node may be identified, creating line segments on either side of the node.

Figure 12:
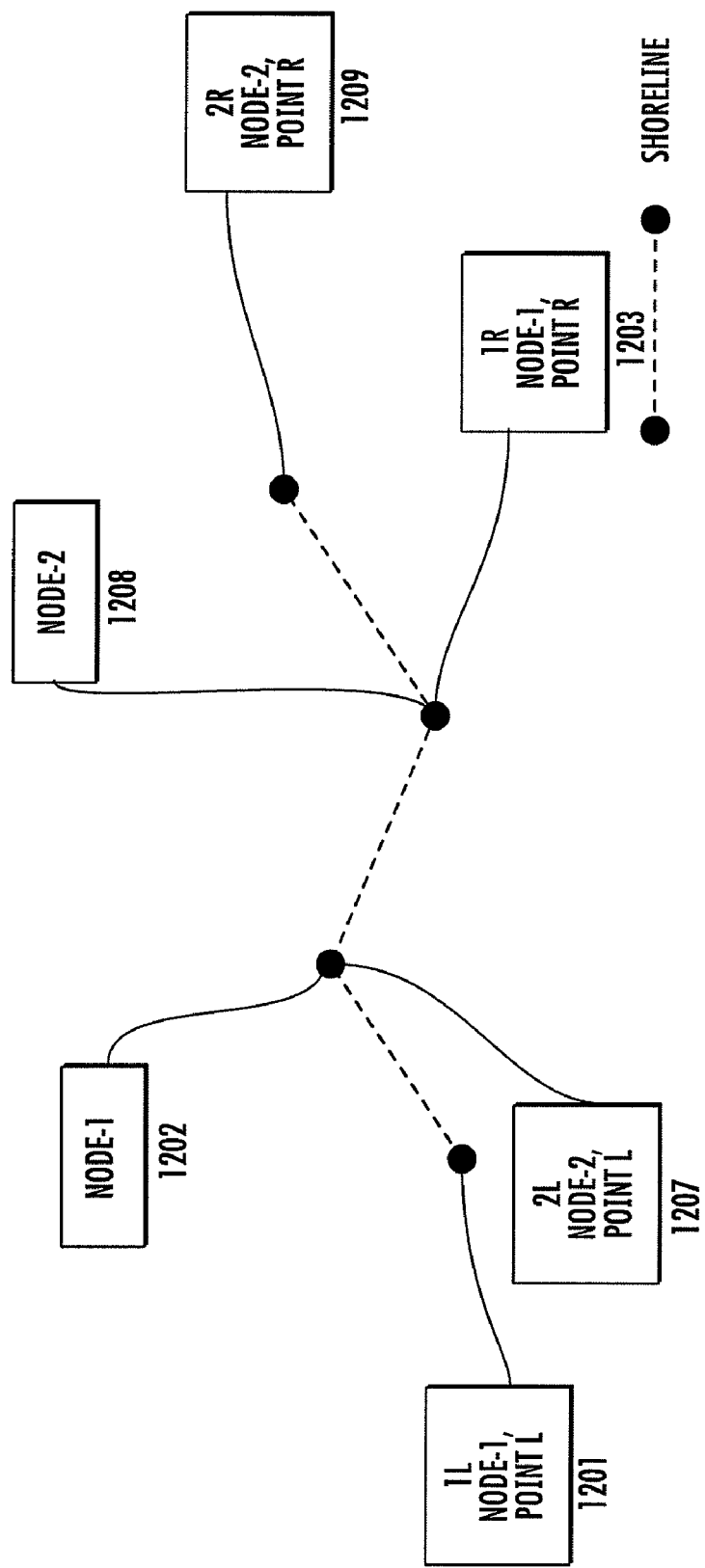
FIG. 12 illustrates various generated nodes and associated line segments in accordance with an aspect of the invention.

FIG. 12 illustrates various generated nodes and associated line segments in accordance with an aspect of the invention. A Node-1 1202 and Node-2 1208 are illustrated in FIG. 12. A point on the left side of Node-1 1202 may be 1L 1201, and a point on the right side of Node-1 1202 may be 1R 1203, identifying two line segments associated with Node-1 1202. Similarly, for Node-2 1208, a point on the left side of Node-2 1208 may be 2L 1207, and a point on the right side of Node-2 1208 may be 2R 1209, identifying two line segments that may be associated with Node-2 1208. Those skilled in the art will realize that for any additional nodes, similar line segments coming into and leading away from each node may also be identified.

In an aspect of the invention, the distance to the shoreline calculations after initial processing of the shoreline file may be completed on a state-by-state basis. In an embodiment, a program may be written to run several spatial queries to accomplish the calculations. The program may be run multiple times with a pass for each state. In another embodiment, larger states such as New York and Texas may be broken into multiple passes each based on estimated processing time. For each state, an estimate for the minimum possible distance a location may be to the shoreline is calculated. In an embodiment, the distance may be calculated between potential geographical agency or customer locations and the closest shoreline.

Figure 13:
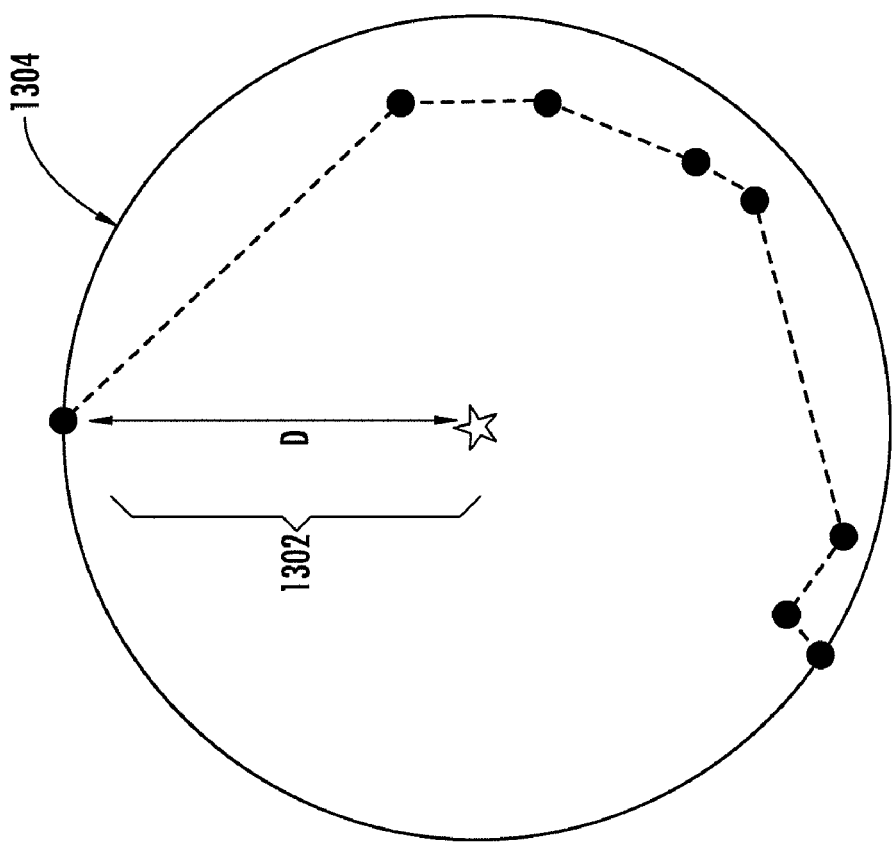
FIG. 13 illustrates determining a maximum radius around a potential agency or customer location within which to locate a shoreline in accordance with an aspect of the invention.
Figure 14:
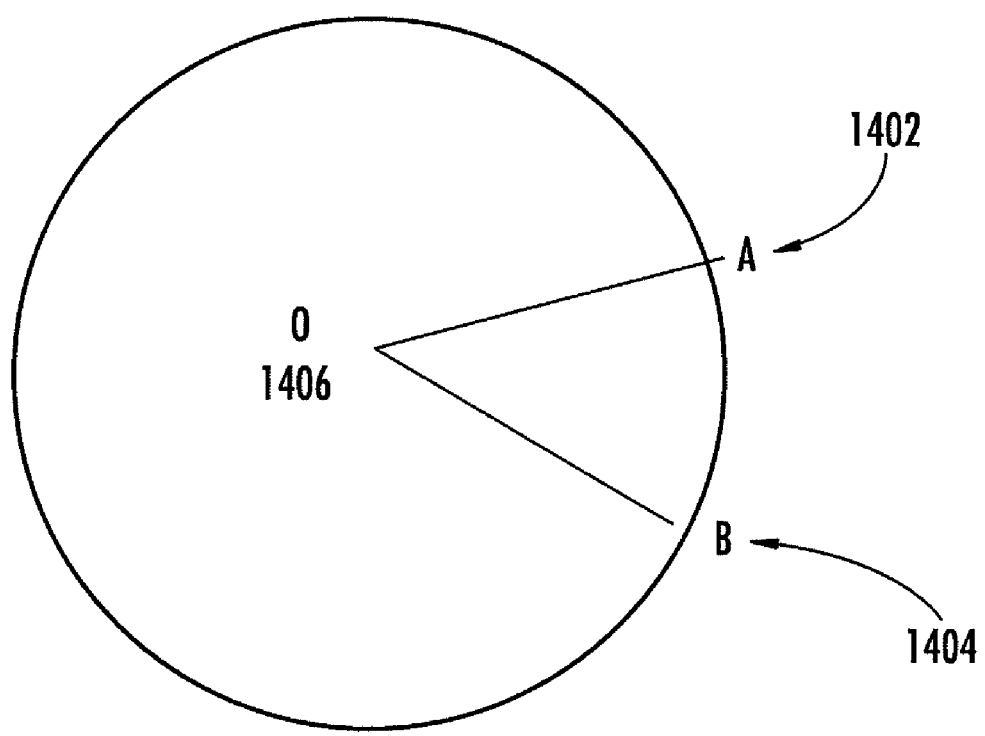
FIG. 14 illustrates calculation of the distance of two points on the earth's surface in accordance with an aspect of the invention.

FIG. 13 illustrates the distance between a potential agency or customer location to a shoreline in accordance with an aspect of the invention. The process to calculate minimum distance may begin with approximating the distance of the furthest state boundary to the shoreline. In FIG. 13, assume this distance to be D 1302. Next, in FIG. 13 a circle 1304 with a radius equal to the maximum distance (D) 1302 as determined around each potential agency/customer location may be drawn. A corresponding circle around each potential agency/customer may be called the shoreline search radius. Next, a query is generated which searches for all shoreline points that fall within the shoreline search radius around each potential agency/customer location. The shoreline search radius increases efficiency of the system. The program then calculates the distance between each shoreline point that falls into the circle around each potential agency/customer location using the formula given below. In an embodiment, the distance may not be calculated using a straight line formula, but takes into account the curvature of the earth. As illustrated in FIG. 14, A & B may be two points (1402 & 1404) on the surface of the earth, and OA and OB are two vectors, where O 1406 is the center of the earth.

Given this, the angle AOB may be determined using the following formula:

$$\mathrm{Cos}(AOB) = [\{\mathrm{Cos}(\mathrm{Lat}A)^*\mathrm{Cos}(\mathrm{Lat}B)\}]^*[\{\mathrm{Cos}(\mathrm{Long}B - \mathrm{Long}A)\} + \{\mathrm{Sin}(\mathrm{Lat}A)^*\mathrm{Sin}(\mathrm{Lat}B)\}]$$

Where LatA is the Y coordinate of point A and LongA is the X coordinate of point A. The distance between points A 1402 and B 1404 (and thus arc AB) may be calculated by R*(AOB). Where R is the radius of the earth and AOB is the angle the two points make with the center of the earth in radians.

Figure 15:
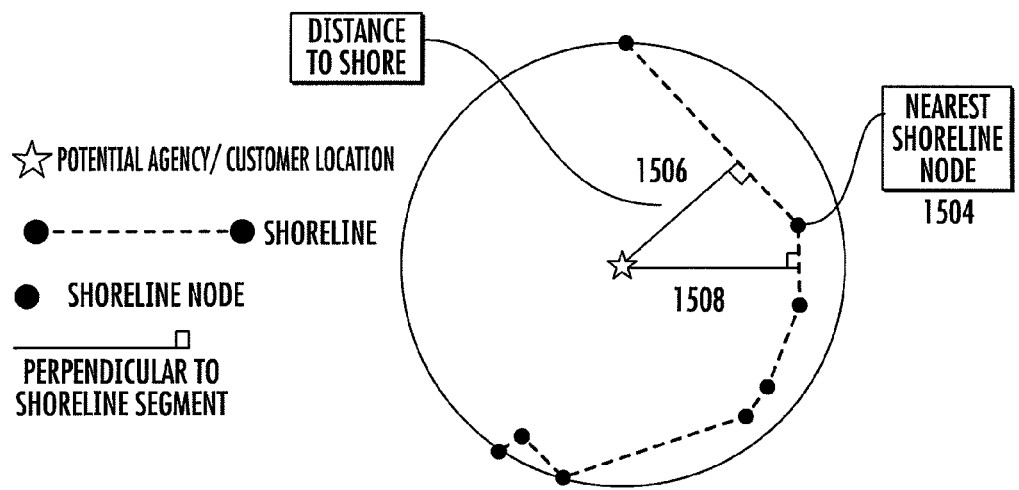
FIG. 15 illustrates calculation of the minimum distance of the potential agency or customer locations to shoreline segments in accordance with an aspect of the invention.

In an aspect of the invention, the distance from each potential agency or customer location to all shoreline points that fall within circle 1304 may be calculated. All points may be evaluated and the shoreline point with the shortest distance to each potential agency/customer location may be selected and associated with each potential agency/customer location. The shoreline segments on either side of the shoreline node 1504 selected are extracted from the shoreline. Finally, the program may calculate the distances 1506 and 1508 of the potential agency/customer location to both shoreline segments and the shorter distance to the shoreline segments may be designated as the distance to shore as illustrated in FIG. 15.

In another aspect of the invention, a calculated distance from a peril may be used as a modeling factor in determining the overall score for each zip code being analyzed for potential new office or branch location.

FIG. 16 illustrates an exemplary user display showing details of a calculated shoreline distance for a potential agency/customer location in accordance with an aspect of the invention. In FIG. 16, a potential agency/customer location address 1602 has been received from a user. Based on the received address 1602, a distance from the shoreline of 2,662 feet or approximately 0.5 miles 1604 has been calculated according to an embodiment of the invention.

Figure 17:
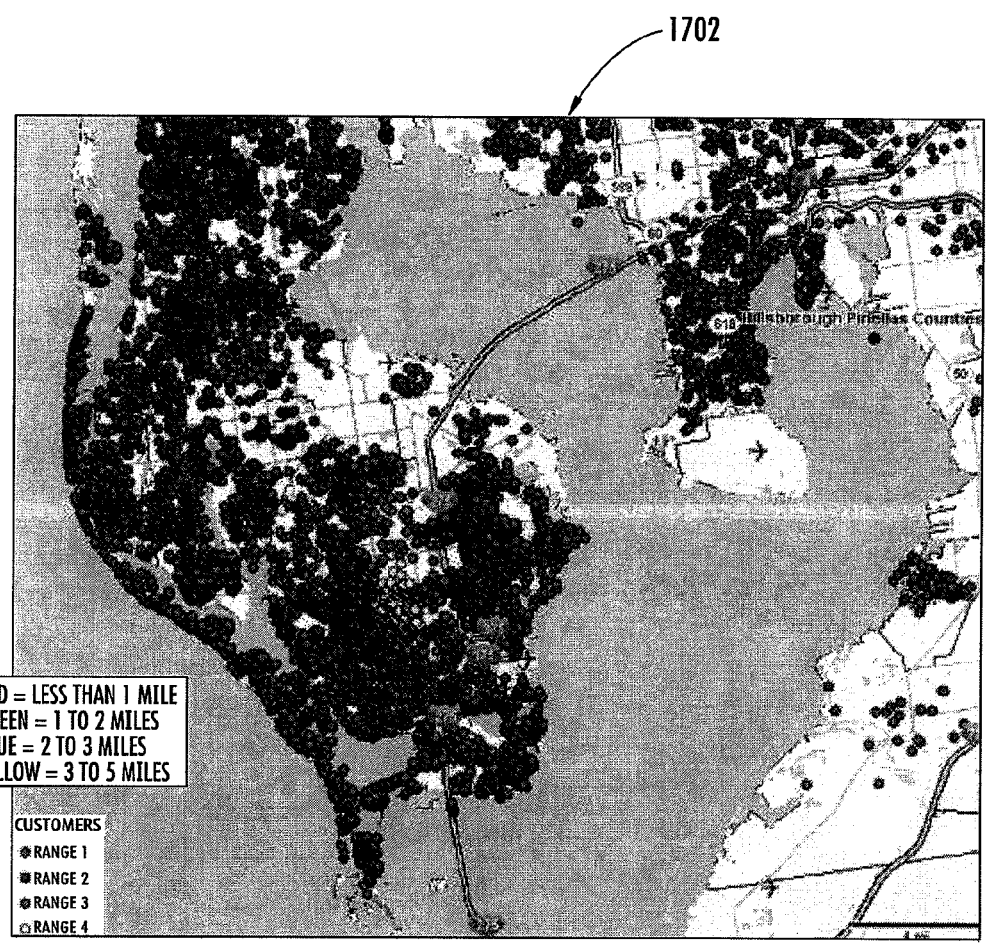
FIG. 17 illustrates a map of homeowner customers within various distance ranges from a shoreline for use in determining potential agency locations and analysis of homeowner concentration in accordance with an aspect of the invention.

FIG. 17 illustrates a map 1702 of homeowner customers within various distance ranges from a shoreline for use in determining potential agency locations in accordance with an aspect of the invention. In FIG. 17, homeowner customers may be highlighted that live within a certain distance from the shoreline. The potential agency location may not be located in such areas as it may acquire more customers that represent additional risks from hurricanes and other perils due to the close proximity to the coastline or shoreline.

Figure 18:
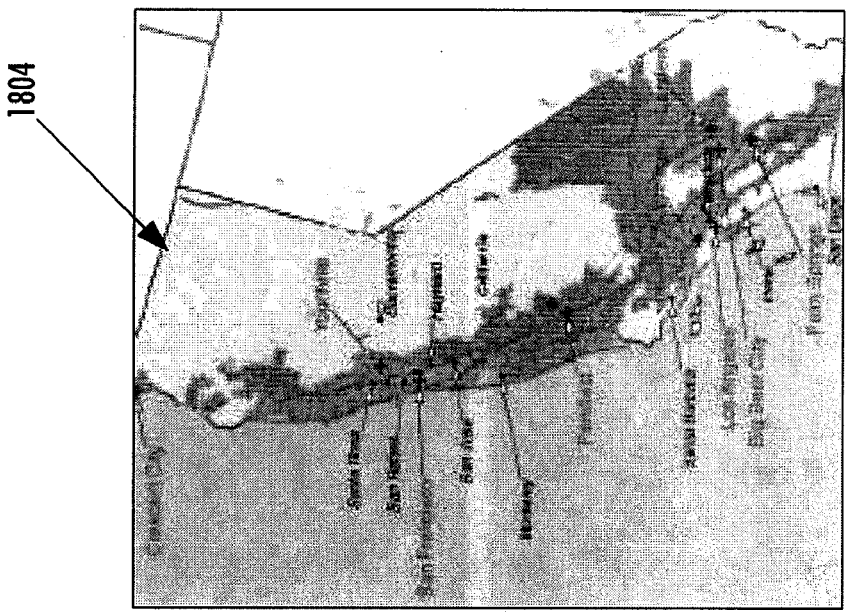
FIG. 18 illustrates a map showing seismic hazard areas and the number of homeowner customer households within a user selected distance range or area for use in determining potential agency locations and analysis of homeowner concentration in accordance with an aspect of the invention.
Figure 18:
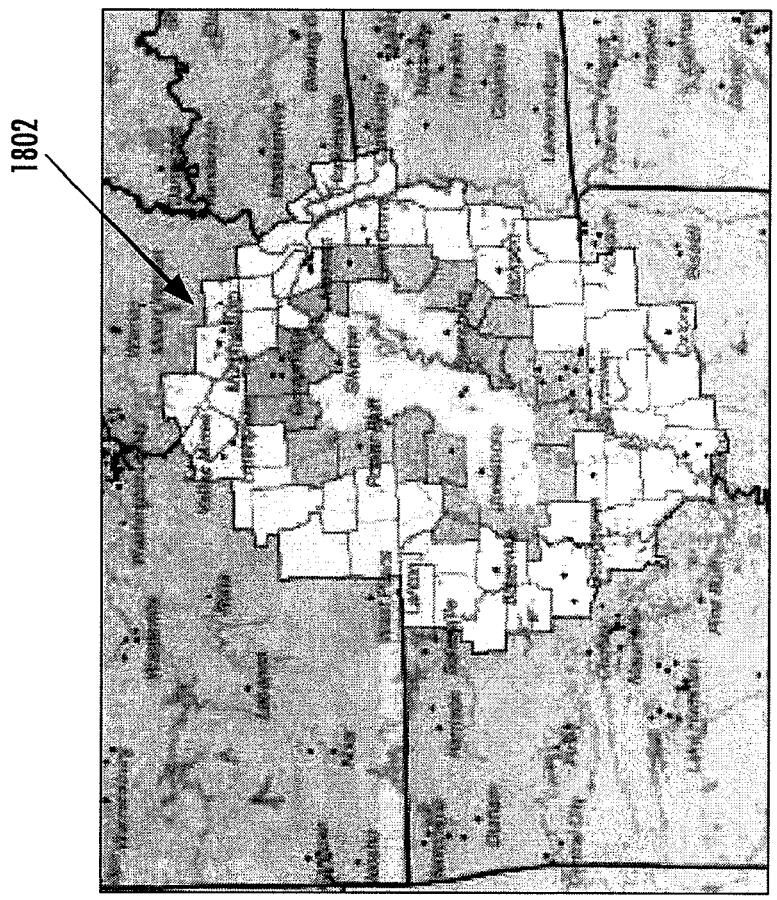

FIG. 18 illustrates maps 1802 and 1804 showing two different seismic hazard areas and the number of homeowner customer households within a user selected distance range of the seismic hazards. The maps 1802 and 1804 may be used for potential agency locations in accordance with an aspect of the invention. Similar to FIG. 17, homeowner customers may be highlighted that live within a certain distance from the seismic hazard. The potential agency location may not be located in such areas as it may acquire more customers that represent additional risks from the seismic hazard.

While the invention has been described with respect to specific examples including presently preferred modes of carrying out the invention, those skilled in the art will appreciate that there are numerous variations and permutations of the above described systems and techniques that fall within the spirit and scope of the invention.

We claim:

1. A method for determining an insurance agency location, the method comprising:
   (a) receiving at least one geographic region to be evaluated for placement of the insurance agency location;
   (b) receiving at least one distance band to a risk border to be evaluated for placement of the insurance agency location;
   (c) determining at least two related zip codes to be evaluated based on the at least one geographic region received in step (a);
   (d) receiving modeling factors to be utilized in the determination of the insurance agency location;
   (e) determining homeowner counts within the received at least one distance band for the determined zip codes, wherein step (e) further comprises using a risk border distance calculation tool, the risk border distance calculation tool utilizing nodes and line segments to determine the homeowner counts within the received at least one distance band for the determined zip codes;
   (f) displaying the homeowner counts within the at least one distance band;
   (g) determining the insurance agency location based on the displayed homeowner counts and the received at least one distance band;
   (h) calculating a final score for each of the at least two zip codes determined in step (c), wherein step (h) further comprises the steps of:
      (i) calculating a composite score for each of the at least two zip codes determined in (c); and
      (ii) calculating the final score for each of the at least two zip codes based on an equation, where "μ" is mean, and "σ" is standard deviation $$\frac{\text{Composite Score} - \mu}{\sigma} = \text{Final Score};$$

and (i) comparing the final scores for each of the at least two zip codes to rank order the at least two zip codes.

2. The method of claim 1, wherein displaying the homeowner counts comprises displaying homeowner locations within the at least one distance band on a map.

3. The method of claim 2, wherein the map includes street level information.

4. The method of claim 2, wherein the map includes aerial imagery.

5. The method of claim 2, wherein the map includes the use of 3D cartography.

6. The method of claim 1, wherein the displaying the homeowner counts comprises displaying homeowner locations within the at least one distance band in a report.

7. The method of claim 1, wherein the composite score comprises a weighted composite score.

8. A method for determining an insurance agency location, the method comprising:
   (a) receiving at least one geographic region to be evaluated for placement of the insurance agency location;
   (b) determining at least two related zip codes to be evaluated based on the at least one geographic region received in step (a);
   (c) receiving modeling factors to be utilized in the determination of the insurance agency location;
   (d) receiving distance bands to a risk border to be utilized in the determination of the insurance agency location;
   (e) calculating a final score for each of the at least two zip codes determined in step (b), wherein the calculating the final score further comprises the steps of:
      (i) calculating a composite score for each of the at least two zip codes; and
      (ii) calculating the final score for each of the at least two zip codes based on an equation, where "$\mu$" is mean, and "$\sigma$" is standard deviation, $$\frac{\text{Composite Score} - \mu}{\sigma} = \text{Final Score};$$

(f) calculating homeowner counts within the received distance bands for each of the at least two zip codes, wherein step (f) further comprises the step of using a risk border distance calculation tool, the risk border distance calculation tool utilizing nodes and line segments to determine the homeowner counts within the received distance bands for the determined zip codes;
   (g) comparing the final scores for each of the at least two zip codes to rank order the at least two zip codes;
   (h) displaying the final scores and the calculated homeowner counts for each zip code on a map; and
   (i) determining the insurance agency location based on the ranked final scores and the received distance bands.

9. The method of claim 8, wherein the composite score comprises a weighted composite score.

10. The method of claim 8, wherein the map comprises street level information, aerial imagery, and 3D cartography.

11. An apparatus comprising:
   (a) a display;
   (b) a memory;
   (c) a processor coupled to the memory and programmed with computer-executable instructions for performing steps comprising:
      (i) receiving at least one geographic region to be evaluated for placement of an insurance agency location;
      (ii) determining at least two related zip codes to be evaluated based on the at least one geographic region received in (i);
      (iii) receiving a distance band to a risk border to be used in determining the placement of the insurance agency location;
      (iv) receiving modeling factors to be utilized in the determination of the insurance agency location
      (v) determining homeowner counts within the received distance band for the at least two zip codes determined in (ii), wherein step (iv) further comprises the step of using a risk border distance calculation tool, the risk border distance calculation tool utilizing nodes and line segments to determine the homeowner counts within the received distance band for the determined zip codes;
      (vi) calculating a final score for each of the at least two zip codes, wherein the calculating the final score further comprises the steps of:
         (a) calculating a composite score for each of the at least two zip codes; and
         (b) calculating the final score for each of the at least two zip codes based on an equation, where "$\mu$" is mean, and "$\sigma$" is standard deviation, $$\frac{\text{Composite Score} - \mu}{\sigma} = \text{Final Score};$$

(vii) comparing the final scores for each of the at least two zip codes to determine the zip code with the highest final score; and
      (viii) determining the insurance agency location based on the final scores and the received distance band.

12. The apparatus of claim 11, the processor further configured to perform the steps comprising:
   (vii) displaying the determined homeowner counts within the distance bands for each determined zip code; and
   (viii) displaying the final scores for each zip code.

13. The apparatus of claim 12, wherein the displaying the homeowner counts within distance bands and the final scores comprises displaying the homeowner counts and the final scores on a map.

14. The apparatus of claim 13, wherein the map comprises street level information, aerial imagery, and 3D cartography.

* * * * *